(12) United States Patent
Clark

(10) Patent No.: US 9,391,957 B2
(45) Date of Patent: *Jul. 12, 2016

(54) SYSTEM AND METHOD FOR SECURE COMMUNICATION BETWEEN DOMAINS

(71) Applicant: Paul C. Clark, Bethesda, MD (US)

(72) Inventor: Paul C. Clark, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,447

(22) Filed: Apr. 7, 2014

(65) Prior Publication Data

US 2015/0074767 A1 Mar. 12, 2015

Related U.S. Application Data

(63) Continuation of application No. 13/532,246, filed on Jun. 25, 2012, now Pat. No. 8,695,066, and a continuation of application No. 09/568,215, filed on May 9, 2000, now abandoned.

(51) Int. Cl.
*G06F 21/00* (2013.01)
*H04L 29/06* (2006.01)
*G06F 21/60* (2013.01)
*H04L 29/08* (2006.01)

(52) U.S. Cl.
CPC ............ *H04L 63/0236* (2013.01); *G06F 21/00* (2013.01); *G06F 21/606* (2013.01); *H04L 29/06* (2013.01); *H04L 67/42* (2013.01); *H04L 67/02* (2013.01)

(58) Field of Classification Search
CPC ..... H04L 63/0236; H04L 29/06; G06F 21/00; G06F 21/606
See application file for complete search history.

(56) References Cited

U.S. PATENT DOCUMENTS

| | | | | |
|---|---|---|---|---|
| 6,105,027 A | * | 8/2000 | Schneider | H04L 63/0218 |
| 6,356,529 B1 | * | 3/2002 | Zarom | H04L 29/06 370/231 |
| 6,664,969 B1 | * | 12/2003 | Emerson | G06F 3/1454 345/531 |
| 6,678,821 B1 | * | 1/2004 | Waugh | G06Q 10/107 380/277 |

* cited by examiner

*Primary Examiner* — Lisa Lewis
(74) *Attorney, Agent, or Firm* — Cahn & Samuels, LLP

(57) ABSTRACT

A system and method of executing secure communications between first and second domains includes a first logical unit and a second logical unit. The first logical unit periodically calculates timestamps and hashes. The first logical unit also transmits a web form to a node of a first domain responsive to a request and the web form is displayed to a user. The first logical unit receives data input to said web form by the user and enhances the data by adding one or more security services. The first logical unit translates the received data from a first network application level protocol to a target network application level protocol while preserving said data security enhancements and transmits the translated data across a public network. A second logical unit de-enhances the translated data and filters the translated data data. The second logical unit further authorizes the filtered data and transmits the filtered data to a node of the second domain for use in an application.

3 Claims, 6 Drawing Sheets

SYSTEM AND METHOD FOR SECURE COMMUNICATION BETWEEN DOMAINS

I. CROSS-REFERENCES TO RELATED PATENT APPLICATIONS

This application is a continuation of application Ser. No. 13/532,246 filed Jun. 25, 2012 which is a continuation of application Ser. No. 09/568,215 filed May 9, 2000, which are each incorporated herein by reference.

II. BACKGROUND OF THE INVENTION

The Internet is rapidly changing the way business is conducted. Existing security mechanisms are deemed to be adequate for low value transactions, but are not sufficient for high value business-to-business (B2B) and Business-to-Consumer (B2C) transactions. Current solutions generally use Secure Socket Layer (SSL) to encrypt traffic between a client's browser and a web server. SSL provides confidentiality by encrypting session traffic at the network level, but does not provide authentication or non-repudiation of transactions. In addition, SSL protects traffic between the browser and the web server only. Many applications reside on a separate server, with the web server providing the front-end or user interface. Traffic between the web server and the application server is not protected by SSL. See FIG. 1. More particularly, known SSL systems employ 40 bit encryption with an option to upgrade to 128 bit encryption. Authentication is performed using standard password techniques. Batch transfer of large data files is not feasible.

FIG. 1 illustrates a conventional SSL system. As shown, an SSL web client 1 is connected to a web server 2 via the Internet. Communication between the SSL web client 1 and the web server 2 is protected through encryption. Web server 2 also communicates with database server 3. However, no further security is associated with the communication.

Since web servers are often placed outside of the corporate firewall to allow open access to customers and partners, i.e., on untrusted networks, the web server is open to attack. There have been several documented attacks on web servers where customer information (i.e., credit card numbers) that was protected via SSL has been compromised. Further, although the data may be protected in transit, cases involving the defacement of web pages are too numerous to list.

Firewalls have been widely deployed on the Internet to protect corporate networks from outsiders. In order to allow access to customers and partners, services must be allowed through the firewall. Adding new services means adding new access holes in the firewall, and potentially adding new vulnerabilities. If an unauthorized user traverses the firewall, they may attack the web server with relative anonymity. Accordingly, there is a need for a system for secure communicating data between domains that protects the integrity of data in transit and data stored on a back-end server, e.g., web server, while allowing the appropriate level of access to authorized users.

III. SUMMARY OF THE INVENTION

The system according to the present invention provides high assurance security services to network applications. The system can be placed in front of existing applications without modification to the original interface or back-end data processing. The invention protects the mechanism used to intervene between the server and the client to dynamically protect user interface and data submission transactions. The invention is independent of the security services provided and the application protocol.

The invention exceeds the capabilities of SSL and existing firewalls by providing additional security between the firewall and the application server. In one embodiment, a device may be disposed between firewall and the application server that performs an
authentication check to identify the user and verify that the user is authorized to perform the requested function. If the user is not authorized to perform the function, then communication with the server may be restricted or blocked entirely.

In addition, all data exchanged, optionally including the user interface, is treated as a transaction. This allows the transaction to be converted to a target protocol that is compatible with the firewall, which enables multiple services through the firewall through one controlled proxy filter or control mechanism.

In accordance with an aspect of the invention, a method for secure communication between first and second domains is provided. The method includes translating data received from a node of the first domain to a target protocol. Filtering the translated data to block unauthorized transmissions and authenticating the filtered data and transmitting the filtered data to a node of the second domain.

In accordance with another aspect of the invention, a logical system is provided for secure communication between first and second domains. The logical system includes a first logical unit configured to receive data from node of the first domain and translate the data to a target protocol. A second logical unit is provided in communication with the first logical unit. The second logical unit is configured to receive data translated by the first logical unit and to filter the translated data. A third logical unit is in communication with the second logical unit. The third logical unit is configured to transmit the filtered data to a node of the second domain.

In accordance with yet another aspect of the invention, a logical system for secure communication between first and second domains comprises means for receiving data from a node of the first domain; means for translating the data to a target protocol; means for filtering the translated data; and means for authenticating the filtered data and for transmitting the authenticated data to a node of the second domain.

In accordance with still another aspect of the invention, a computer readable medium including instructions for causing a computer to securely pass data between a first domain and a second domain is provided. The computer readable medium includes instructions for causing the computer to translate data received from a node of the first domain to a target protocol. Also provided are instructions for causing the computer to filter the translated data to block unauthorized transmissions. Further provided are instructions for causing the computer to authenticate the filtered data and to transmit the data to a node of the second domain for use in an application.

In accordance with an additional aspect of the invention, a logical system for secure communication between first and second domains is provided. The logical system may include a first logical unit configured to enhance data and a second logical unit configured to receive data from the first logical unit and translate the data to a target protocol. The logical system also may include third logical unit in communication with the second logical unit. The third logical unit is preferably configured to receive data translated by said second logical unit and to filter the translated data. A fourth logical unit, in communication with said third logical unit, is provided and configured to authenticate the translated data. A fifth logical unit in communication with the fourth logical unit is configured to process the authenticated data.

IV. BRIEF DESCRIPTION OF THE DRAWINGS

V. DETAILED DESCRIPTION OF THE DRAWINGS

Figure 1:
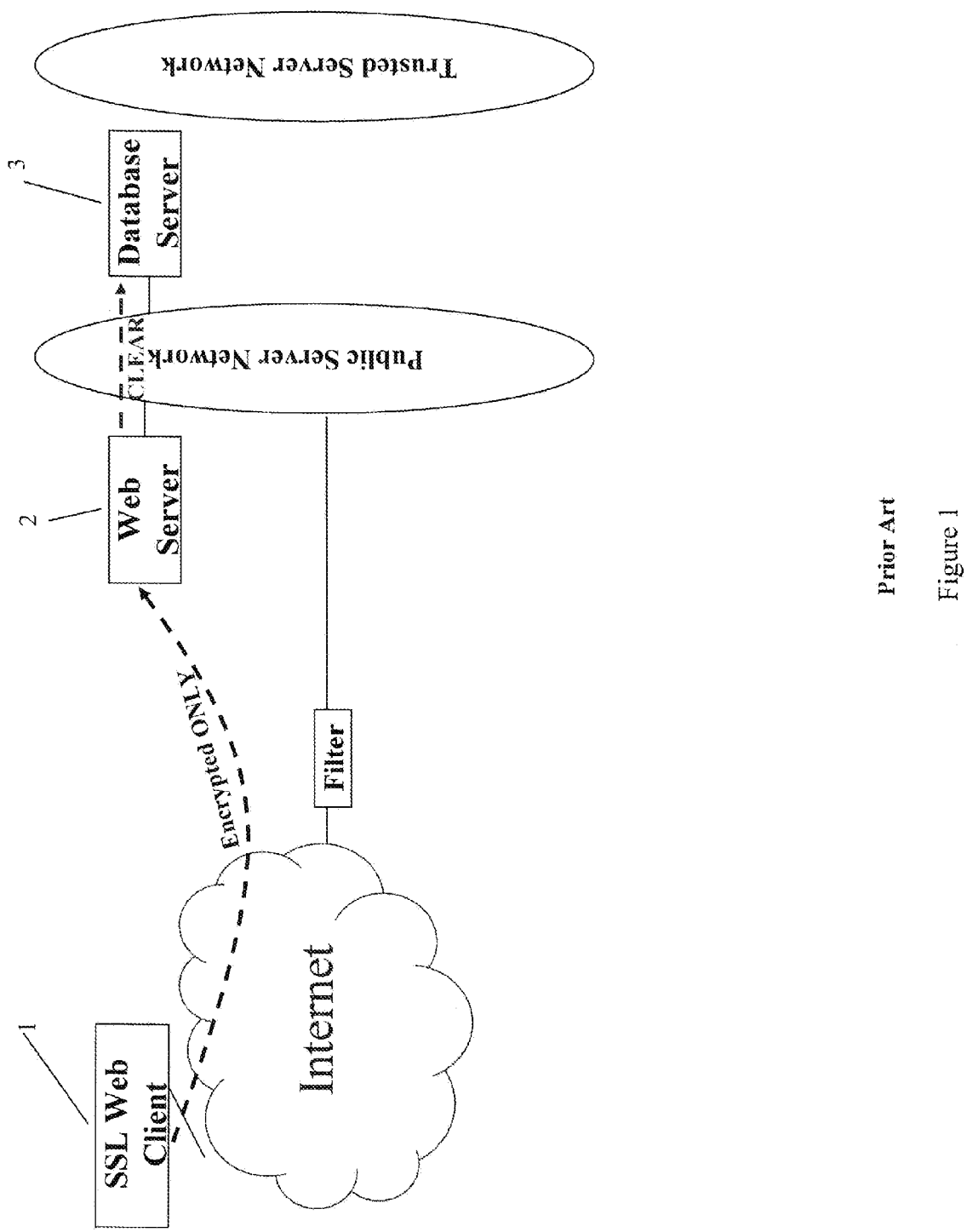
FIG. 1 depicts a prior art SSL system.

The following definitions and explanations provide background information pertaining to the technical field of the present invention, and are intended to facilitate an understanding of the embodiments of the invention. Additional definitions and explanation may be provided throughout the disclosure.

Logical Unit—any device having data processing and transmission capabilities, e.g., computers, PDAs, smart cards, wireless phones and other intelligent devices. Logical units may be realized in circuitry, software or firmware that performs a particular function.

Domain—A domain is a single logical unit or a network of logical units.

Trusted Domain—a computer or network of computers that is separated from other networks by a firewall or bastion host.

Untrusted Domain—a computer or network of computers that is publicly accessible.

Security Client—logical unit that provides services to data before or after transmission to the server.

Protocol Gateway—A logical unit that translates client/server transactions to and from common protocols. In addition, the protocol gateway provides the user interface to the Security Client.

Bastion Host—A logical unit that separates administrative domains (e.g. firewall).

Cryptographic Gateway—a logical unit that provides server side security and authorization for data transactions.

Protocol Client—web browser, email package which would invoke security client, directly or indirectly ACL—a list defining user groups and access rights for groups and individuals Logical System—two or more cooperating logical units.

Data—A representation of facts, concepts, or instructions in a formalized manner suitable for communication, interpretation, or processing by human or automatic means, including but not limited to transactions, web forms, voice information, packets, datagrams, and messages.

The present invention is directed to secure systems for communicating between domains. In accordance with a first embodiment, a system according to the invention may include multiple logical units including a protocol gateway 20, a firewall 30, and a cryptographic gateway 40. The system may be disposed between a client 10 and an application server 50 to facilitate secure communication therebetween. The client 10 may be part of a trusted or untrusted domain. However, application server 50 is preferably part of a trusted domain.

Figure 2:
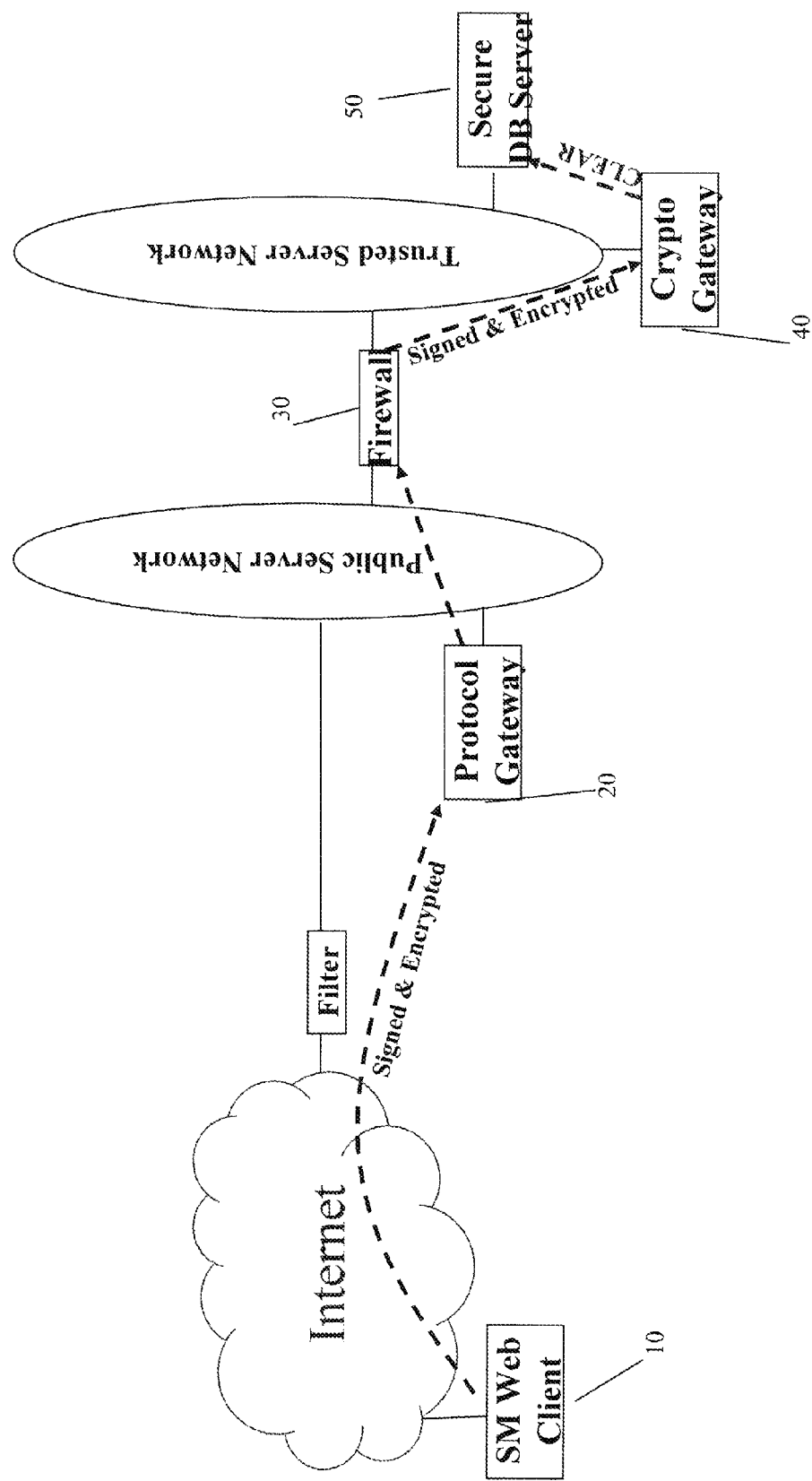
FIG. 2 depicts a secure communication system in accordance with the invention.

FIG. 2 illustrates an exemplary system wherein a secure client 10 and a protocol gateway 20 are in communication with each other. The cryptographic gateway 40 and the application server 50 are likewise in communication with each other. Bastion host 30 communicates with both protocol gateway 20 and cryptographic gateway 40 and separates the untrusted domain from the trusted domain.

The system according to the present invention facilitates secure communication between domains, preferably untrusted and trusted domains. More particularly, secure communication between secure client 10 and application server 50 is enabled by the present invention. As such, the secure client 10 sends secured data through protocol gateway 20, bastion host 30, and cryptographic gateway 40 to application server 50. Responsive data may be returned to secure client 10 in the reverse order.

Each logical unit as we have defined it is described in detail below:

Security Client

The security client 10 provides security services to data before/after transmission to/from a server. The security client 10 can be deployed in software, hardware, and/or firmware. For example, security client 10 may run on a workstation class machine in software or with a smartcard. Likewise a wireless PDA or cell phone might have the client loaded in its firmware. The security client provides a combination of some or all of the following enhancement services: authentication, integrity, confidentiality and non-repudiation. These services are typically implemented but not limited to digital signature, key exchange, encryption, e.g., 3DES (2 or 3 key), biometrics, signature verification, and decryption. These services are provided in an algorithm and mechanism independent fashion. Any mechanism can be used as long as both security client 10 and the cryptographic gateway 40 support it. For example, authentication may be performed using the RSA, DSA, or elliptic curve algorithms. Optionally, a user might be identified with a biometric like a fingerprint or voiceprint. This feature allows the level of protection to be configured based on the sensitivity of the data transmitted. It is expected that new enhancement techniques will be developed in the future. Application of such techniques is contemplated by this invention.

Figure 3:
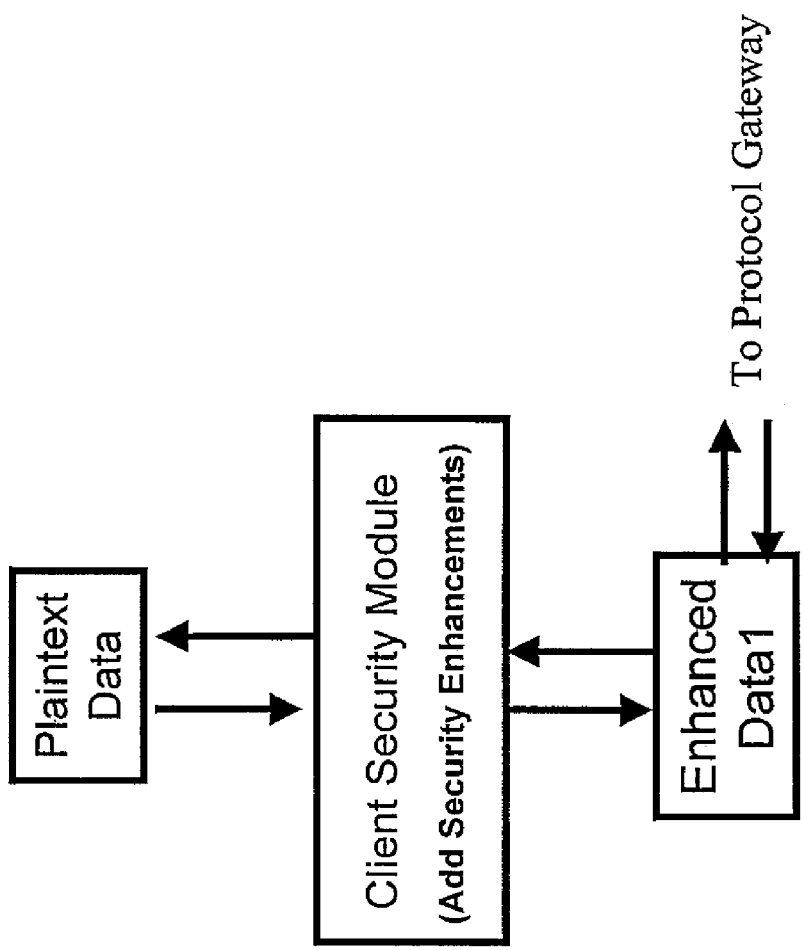
FIG. 3 is a flow chart showing data flow to and from the secure client.

The security client 10 is preferably designed to interact with existing user interface applications and apply enhancement services in a manner known to those of skill in the art. As depicted in FIG. 3, plain text data and enhanced data may be applied to security client 10 where enhancement services (digital signature, encryption, biometrics, signature verification and data decryption) may be added and/or removed. Security client 10 preferably interacts with web browser software, email clients, file and database management software. For example, security client 10 may be implemented as a plugin for Microsoft Internet Explorer®. When the browser receives data that has been signed and/or otherwise protected, it automatically starts the security client plugin. In addition, when a form contains certain hidden fields, the browser may be configured to pass the data through the security client plugin to have encryption and/or signature protection added.

Protocol Gateway

The protocol gateway 20 is a logical unit that preferably translates client/server transactions to and from target/source protocols. For example, protocol gateway 20 can be connected to an X.25 network. When X.400 requests are received, these can be converted to a target protocol recognized by existing firewalls, e.g., SMTP over IP, and passed through bastion host 30 to the cryptographic gateway 40 and on to application server 50. The protocol gateway 20 may be implemented by a workstation class machine and run on the same platform as any other webserver. Alternatively, the protocol gateway 20 may be run on a dedicated platform.

Figure 4:
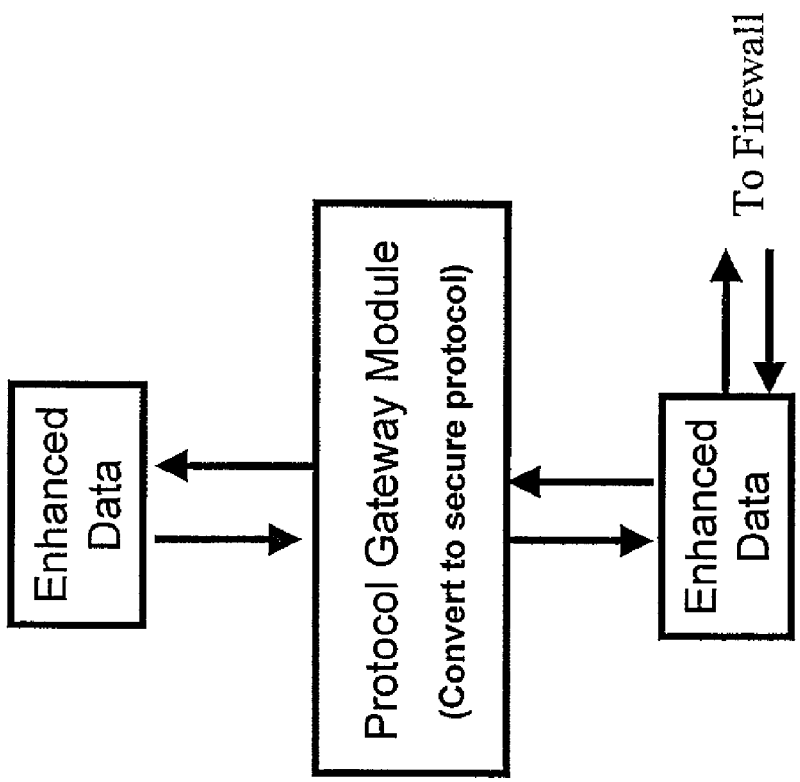
FIG. 4 is a flow chart showing the data flow to and from the protocol gateway.

Protocol gateway 20 generally receives enhanced data including transactions and converts all enhanced data to/from a single transaction protocol such as SMTP as illustrated in FIG. 4. This allows new protocols to be supported with little effort; all that is required is a translation that encodes the data payload of the source protocol data unit (PDU) to the common transaction PDU. Protocol gateway 20 may pass the translated data to firewall 30.

Protocol gateway 20 may also provide the user interface when required by the protocol. For instance, protocol gateway 20 delivers the optionally protected user interface for HTTP connections. The user interface can be static or dynamic and may reside on protocol gateway 20 or on a backend server. Greater security exists when the latter approach is taken. Further, this approach allows the secure system to be placed in front of an existing application without any application modifications.

Firewall

Firewall 30 is logically disposed between protocol gateway 20 and cryptographic gateway 40. In preferred embodiments, firewall 30 includes a bastion host. In a conventional computer system, a firewall may be utilized to separate a local area network from a wide area public network, e.g., the Internet. Firewalls may also be used to secure an intranet domain against unauthorized access. For example, in a large corporate environment, the firewall may separate the local corporate net from a dedicated segment used by one of the corporate departments. Commercially available firewalls such as Gauntlet, Checkpoint, Pix, and Packet filters can be configured to only allow transaction traffic.

A bastion host is a logical unit that separates neighboring domains. All traffic from one domain (the local domain) that is directed to a second domain (the remote domain) must pass through the host. Thus, if a user operating from the local domain would like to communicate with the remote domain, the user must communicate through the bastion host and thus through firewall 30.

User authentication to firewall 30 may be required in order to communicate with the remote domain. Authentication is a check to ensure that the user is authorized to have access to a given device, e.g., an intelligent token, a computer, etc. Existing systems authenticate users through the use of reusable passwords, biometrics or challenge-response techniques. All known authentication techniques are suitable for this invention including each of the foregoing. In a password or biometric based system, after the user has "booted" a local host computer, the user requests a connection to a remote host computer, provides a user identifier and, when prompted, provides a password or template. Successive authentications use the same user identification and authentication data. Hence, an attacker who misappropriates a user's authentication data is able to easily and continuously gain access to the remote host, and, thus, the remote domain.

In a challenge-response system, the remote host requests a user identifier and issues a challenge to the user. The user calculates a response, which, if deemed valid by the remote host, grants access to the remote host. Because the challenge changes for successive authentications, the challenge-response method is not vulnerable to replay attacks as described above. However, responses to the challenges must be computed.

Figure 5:
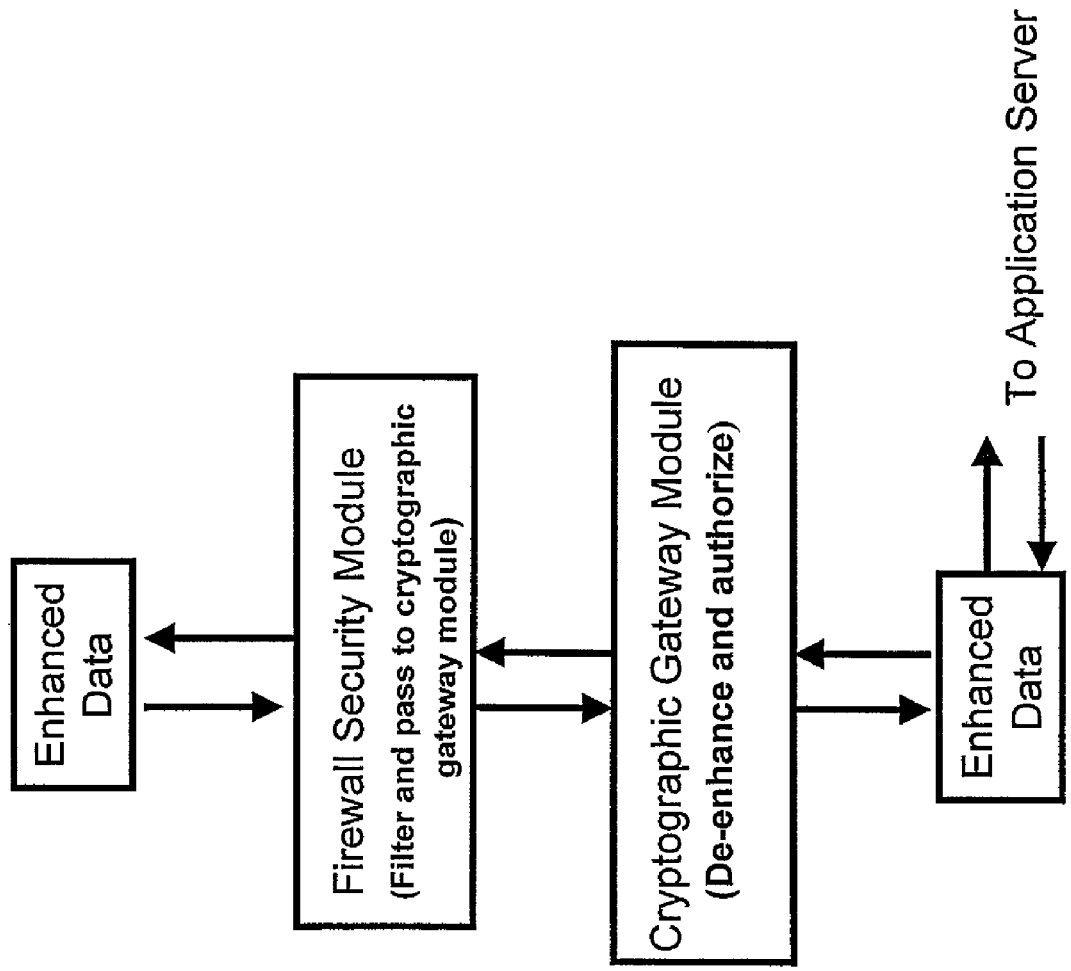
FIG. 5 is a flow chart showing the data flow to and from the firewall and the cryptographic gateway.

As shown in FIG. 5, the firewall may receive enhanced data from the protocol gateway and from the cryptographic gateway. The firewall filters the enhanced data and passes it to one of the cryptographic gateway and the protocol gateway. In addition, firewall 30 may include a proxy server. Hence, the firewall is preferably positioned between the untrusted domain and the trusted domain.

Cryptographic Gateway

Cryptographic gateway 40 is a logical unit that preferably provides the server side security and authorization services for data transactions. Cryptographic gateway 40 performs de-enhancement services, e.g., signature verification and decryption services, as required on data received from clients. It also provides enhancement services, e.g., signs and/or encrypts, for data received from application server 50 before it is transmitted to the client. As shown in FIG. 2, the cryptographic gateway 40 is logically located behind or downstream from the firewall. Accordingly, cryptographic gateway 40 is part of the trusted network. This configuration enables data protection from the client's desktop to the application server behind the firewall. The cryptographic gateway 40 may be run on standard computer hardware, e.g., a workstation class machine. Alternatively, the cryptographic gateway may be embodied in add-in boards or a smart token.

Similar to security client 10, cryptographic gateway 40 provides some combination of the following enhancement/de-enhancement services: data encryption, digital signature, decryption, and signature and/or biometric verification. The services are algorithm independent, however, to enable them to interact, it is preferred that the security client and the cryptographic gateway mechanisms and algorithms be compatible.

Cryptographic gateway 40 further performs an operation authorization function. That is, cryptographic gateway 40 performs an authentication check on data to determine whether the user is authorized to perform the requested operation. To facilitate authentication checking, cryptographic gateway 40 preferably has stored therein an access control list. Authentication checking is preferably performed by comparing information contained in the data received from firewall 30 with information stored in the access control list.

Application Server

Application server 50 is logical unit that is preferably independent of the rest of the security system. Application server 50 provides a user interface and functionality to the system. The user interface may be transferred to protocol gateway 20 either statically or dynamically. For simple user interfaces that do not change very often, the user interface may be transferred to protocol gateway 20, embedded with the security features provided by the security system, and stored on protocol gateway 20 for client retrieval. For complex or dynamically generated user interfaces, protocol gateway 20 can request the interface from application server 50 as needed. Protocol gateway 20 then adds the necessary security tags (if any) and provides the interface to the client.

When the client submits data to application server 50, the data may be signed and/or encrypted. Cryptographic gateway 40 verifies the signature and decrypts the data, then submits the data to application server 50. Application server 50 accepts the data the same way it would if connected directly to the client. Application server 50 may be completely unaware of the security services provided. After processing the data, application server 50 sends any response to the client. Cryptographic gateway 40 intercepts the response and provides any required enhancement security services. The secured data is then sent through protocol gateway 20 to the client.

Operational Aspects

In operation, a user desirous of making a secure connection to the application server 50 may initiate a connection with the protocol gateway server using a protocol client. For example, the user may employ a web browser to access the server's web interface. The web interface may be obtained via the protocol gateway. When the user submits data to protocol gateway 20, security client 10 may enhance the data by providing encryption and/or digital signature services to the data as required. In certain applications, the security client need not provide enhancement services.

Protocol gateway 20 preferably converts the submission to the target protocol as necessary and transmits the transaction through firewall 30 to cryptographic gateway 40. Protocol gateway 20 may transmit data directly through firewall 30 to cryptographic gateway 40.

If the information is encrypted, the protocol gateway 20 will not have access to any of the plain-text data. The data will be protected from the user's browser through the firewall to the protected server domain.

In addition, protocol gateway 20 may provide a web interface. The web interface may be retrieved from application server either upon request from security client 10 or based upon requests from the protocol gateway 20. The interface may enable the user to display data and/or forms received from the application server 50, which is logically disposed behind the firewall.

The firewall verifies that the transaction is coming through a permitted port and optionally logs the exchange. The data may then be passed to cryptographic gateway 40 where it may be de-enhanced. Alternatively, the data may be relayed using a known anti-spoofing technique such as that described in U.S. Pat. No. 5,781,550.

The cryptographic gateway 40 de-enhances the data by, e.g., verifying digital signatures and decryption. If the enhancement services are successfully removed, the data is preferably authenticated by, for example, checking the user's access rights against an access control list. If the user is authorized to perform the operation requested, the necessary data may be passed to application server 50 for further processing. If the user is not authorized to perform the operation, then the data is blocked from passage to the application server 50.

When application server 50 finishes processing the data, it returns any responses to cryptographic gateway 40. The data may then be optionally protected via digital signature and/or encryption. The protected data is passed through the firewall to protocol gateway 20, and then returned to security client 10. Security client 10 verifies any digital signatures and performs any required decryption. If these operations are successful, the data may be returned to the user, in the exemplary case to the browser where it may be displayed.

Operational Example

In keeping with the invention, the general flow of information for an exemplary web-enabled secure database (or other) application is as follows:

Web forms are either periodically refreshed to the protocol gateway from a secure server, or dynamically retrieved from the application server by the protocol gateway at the request of the client.

Web forms are retrieved by the secure client from the protocol gateway and presented to the user in a Web browser.

The user fills out the form and submits it.

The software on the client machine processes the information in the Web form, enhances the data (e.g. signs and encrypts it), as required from the local configuration and possibly the remote configuration from the protocol gateway, optionally informs the user of the enhancement in a client browser window, sends the enhanced message back to the protocol gateway and invokes a process on the protocol gateway to convert the enhanced message to the gateway protocol.

The protocol gateway creates a unique filename for the transaction, possibly does some further processing (e.g. adds transaction headers) and forwards the message through the firewall to the cryptographic gateway.

A process on the cryptographic gateway de-enhances the message, checks the user's authorization to perform the desired actions, and passes the message to the application server using a configurable protocol (for now, Simple Mail Transfer Protocol (SMTP), ftp, or local).

On the application server, a program is invoked either by the receipt or a mail message by an application-specific alias or by a polling process checking for files received via ftp. The application server checks that the message came from the cryptographic gateway, may do an additional application-specific authorization check, processes the request, and returns the result to the cryptographic gateway.

A process on the cryptographic gateway processes the result, possibly adding formatting, header information, etc., enhances the message and sends it back to the protocol gateway.

On the protocol gateway, a process receives the message, parses it and passes it on to the process started earlier, which is waiting for a response. Additional processing is then performed and the enhanced result is forwarded to the client.

The return of the enhanced result to the client Web browser invokes the client plugin, which de-enhances the result, informs the user in a client browser window, and presents the result to the user in the Web browser.

When a Web form has been filled out and submitted, the data from the form is in the general format:

<tag> <value> with one <tag>/<value> pair per line. There may be multiple lines with the same <tag> and different <values>. Different <tag>/<value> pairs are used by different processes within the system (on the protocol gateway, the cryptographic gateway, and the Application Server). The sets of <tag>/<value> pairs used by each of the different processes will be delimited by the lines:

section_start <section name>
section_end <section name>

Nevertheless, the sets of <tag>/<value> pairs should be in the order presented here for backward compatibility. Also for backward compatibility, the cryptographic gateway (and legacy applications) should consider the section_start and section_end tags as optional.

The order of sets should be as follows:

1. SMwclnt

The SMwclnt processes the data it receives from the Web form and writes it to a text file. The general format of the text file will be:

<tag>=<value> with one <tag>/<value> pair per line. There may be multiple lines with the same <tag> and different <values>. The SMwclnt uses the following <tag>/<value> pairs and then deletes them, i.e. does not pass them on further.

section_start SMWCLNT Start of the SMwclnt section, tells SMwclnt that all fields in this section should be deleted before enhancing the message and sending it back to the protocol gateway.

services [P|[[C] [I] [A]]] (plain text OR confidentiality and/or integrity and/or origin authentication) Indicates services requested in the form from the PROTOCOL GATEWAY, local configuration overrides or supplements this field, if values for this tag conflict default to the most secure option selected.

functionality [ENC] [SIG] [MIC] [BIO] [PWD] Encryption (ENC), digital signature (SIG), MIC (MIC), biometric (BIO), password (PWD). Requested in the form from the protocol gateway, local configuration overrides or supplements this field.

Services and functionality tags must come in pairs and there may be multiple pairs.

recipient <alias> Indicates recipient for whom to encrypt, if encryption is specified. This field may be utilized if the services=C and functionality=ENC tag/values are specified otherwise, preferably, it is ignored.

destination <URL> URL of the process on the protocol gateway that will be invoked to forward the submitted information.

confirmation <Y|N> Whether or not to display a message box and ask the user to confirm any enhancement taking place for this transaction, if this tag is not present or value is <blank> then display a message box)

section_end SMWCLNT End of the section.

Any tags within the section may have a value of <blank>, in which case they will be ignored. However, if encryption is specified (through the following <tag>/<value> pairs: services=C, functionality=ENC), a recipient tag with a value must be present.

2. Protocol Gateway Section

This section contains any information used by scripts/programs on the protocol gateway. In particular, programs that service client connections for the source protocol, as well as those that convert source protocol to target protocol while preserving data security enhancements, if any. The SMwclnt will place these tags before the enhanced message in the file since the protocol gateway cannot read the contents of the enhanced message. The section includes:

section_start protocol gateway config_filename <Filename> Filename of the application-specific configuration file to be used by the SMprotocol gateway program on the protocol gateway.

section_end protocol gateway

The rest of the message will be cryptographically enhanced at the client as determined by the local (and possibly the Web form's) service configuration.

3. Cryptographic Gateway Section

Information used by the cryptographic gateway (program SMsa3) to check the authorization for the request. This includes:

section_start cryptographic gateway resource_access=<resource>:<access> The resource to be accessed, in the new ACL format described below and the operation that is to be performed on the resource: r(ead), a(ppend), d(elete). The value(s) always comes from the Web form since it is application-specific and not known to the SMwclnt.

untrusted_user=<User ID> This tag is not used except when the functionality tag above does not include the value for 'digital signature'. It contains the 'untrusted' user wishing to access a resource. The value can come either from the protocol gateway if the user has had to log in to the Web site or from the SMwclnt, which can check which user is currently logged in on the local machine. If there is no user tag in the submitted Web form and the functionality tag above does not include the value for 'digital signature', the SMwclnt should add this tag.

application_label=<label> The descriptive label of the application that is being run. This is used by the SMsa3 process to know where to pass on the body of the message, once access has been granted by the ACL check. This label can also be passed on to the application server where it can be used as the descriptive label in the response back to the client (i.e. instead of using the label in the application's configuration file).

section_end cryptographic gateway

In order to be backward compatible, the protocol will support the following tags in the cryptographic gateway section:

rsrc_oper=<resource>:<r|a|d>
username=<username>
usertype=<usertype>
query_type=<queryname>

When the SMsa3 process parsing the message finds one of these tags, it will assume the message came from a client not using the SMwclnt software and process all further data accordingly. There may be additional, application-specific <tag>/<value> pairs in the APP section handled by the appropriate application. At the end of a message coming from a client other than SMwclnt, there may be a line B1 =Submit.

4. APP Section

This application-specific information will be completely ignored by the cryptographic gateway but the SMwclnt could potentially add to this information (see below). The format of the <tag>=<value> pairs in this section should support application-specific authorization checking, all functionality available in Web forms, and maybe some additional features, such as images or other encoded binary data.

The <value> fields in this section will be encoded to support special characters, images and other binary data without the need for attachments and special processing. Some examples are included below of application-specific <tag>=<value> pairs that may be supported.

section_start APP weborigin=<hostname of originating protocol gateway> scriptpath=<path> Location of a script to be called on the protocol gateway by the next step in an application-specific sequence.

scriptname=<script> Process to be called on the protocol gateway by the next step in an application-specific sequence.

username=<username> user ID with which to access the application-specific database.

query_type=<query> Query to be performed with the information in the form.

backlocation=<URL> Where to go when the user presses a 'back' button on the generated results page.

protocol gatewaytime=<time> Timestamp calculated by the protocol gateway periodically, used to prevent replay and repudiation.

hash=<hash> Hash of the entire form as calculated by the protocol gateway, if the form came from a secure Web refresh server the hash would be calculated there.

hash_algorithm=<algorithm ID> Hashing algorithm used by the protocol gateway to hash the blank form.

clienttime=<time> Timestamp calculated and inserted by SMwclnt, i.e. when the client sent this filled-out form.

section end APP

A note on timestamps and hashing on the protocol gateway: Since no process is run on the protocol gateway right before the empty form is retrieved by the client, timestamps and hashes have to be calculated by a (cron-like) process on the protocol gateway on a continuous basis—e.g., once a minute. Since the value of the hash and the hashing algorithm are part of the form to be hashed, the following procedure or similar should be followed on the protocol gateway when creating the timestamp and hash:
  Lock the form file
  open the form file
  calculate timestamp and write it to protocol gatewaytime,
      i.e. protocol gatewaytime=<timestamp>
  blank out the value of the previous hash, i.e. hash=<blank>
  write the hash algorithm to be used for the current hash, i.e.
      hash_algorithm=<algorithm to be used now>
  close the form file
  calculate the hash using the chosen algorithm
  open the form file
  write the new hash into the form file
  close the form file
  unlock the form file On the application server, information from the cryptographic gateway can be received via multiple protocols: SMTP, ftp or local. Depending on which protocol is used, the application process will be started differently.

Communications with Cryptographic Gateway

The SMpoll process is running on the application server, as a daemon on a Unix application server or as a service on a Windows NT machine. This process checks a configurable directory or directories for the existence of a file. If the file is found, SMpoll starts the appropriate, configurable application and passes into it the contents of the found file. Once the application has completed processing, it sends its response back to the cryptographic gateway via FTP, SMTP or other protocol. On the cryptographic gateway, a similar SMpoll process is running to look for the receipt of a response file and start the secure messaging facility (SMF) application as appropriate. The secure messaging facility enhances and de-enhances transactions.

Format of Resource Values in the Protocol and ACL Files

The value for the "resource" tag in the ACL file and the cryptographic gateway section of the client/server protocol is in URL format and contains information about the specific resource that the user is trying to access. Each resource URL begins with the protocol used—currently 'SM' indicating applicant's protocol. However, any protocol is suitable for this invention. There are many different types of resources used in the authorization check on the cryptographic gateway. In addition, there may be more detailed, application-specific resources, for which authorization can be checked on the application server (for example, specific records in a database or subtasks/queries within an application). These are the resources for which authorization will be checked on the cryptographic gateway:

Files and Directories
  securemethods://<network resource>/path/<filename> or
    <directoryname>
Applications
  secremethods://<network resource>/path/<application
    name>
Network Resources Such as Hosts, Printers, Mass Storage Devices, etc.
  securemethods://<network resource>/
Databases
  securemethods://<network resource>/<database>
Database tables
  securemethods://<network resource>/
    <database>.<database table>
Format of Access Control List file
  An Access Control List (ACL) is preferably stored in a file on the cryptographic gateway controls access to the various applications. This ACL file defines groups of users and access rights to resources both by these groups and by individual users.

The group and access rights sections are each started by a keyword (--GROUPS-- and --ACL--). The resources to be accessed are listed one resource per line. Following the resource, the ACL file specifies the groups and individuals with access to the resource along with the access rights for each group or individual. Access rights are enclosed in parentheses and may consist of any or all of the following:
  r—the individual or group can read the resource
  a—the individual or group can append data to the resource
  d—the individual or group can delete data from the resource As shown in the example ACL file below, the ACL file includes two sections—a group definition section, denoted by the --GROUPS-- keyword, and a resource access section, denoted by the --ACL-- keyword. In the example below, three groups are defined in the groups section: group1, group2, and group3. The ACL section defines access rights by these groups and several individuals to six resources: one directory, three files, one executable, and one database table.

```
# this is the group section
--GROUPS--
# administrator group
group1: jon, bob
# user group
group2: sue, josh
group3: sue, frank
--ACL--
securemethods://blah1.tcntr.com/: group1 (r)
securemethods://blah1.tcntr.com/file2: bob (r), jon (rad),
   group2 (ra)
securemethods://blah2.tcntr.com/file2: group1 (ra), sue
   (r), group3 (ra)
securemethods://blah1.tcntr.com/app1.exe: jon (rad), group1
   (ra)
securemethods://blah1.tcntr.com/path/file1: group1 (r)
securemethods://blah2.tcntr.com/appdb.users: bob (rad),
   joe (rad)
```

For readability, the resources could be grouped by the application they apply to or some other grouping, but this is optional. Order should not matter when checking authorizations.

Maintaining ACL Files

Figure 6:
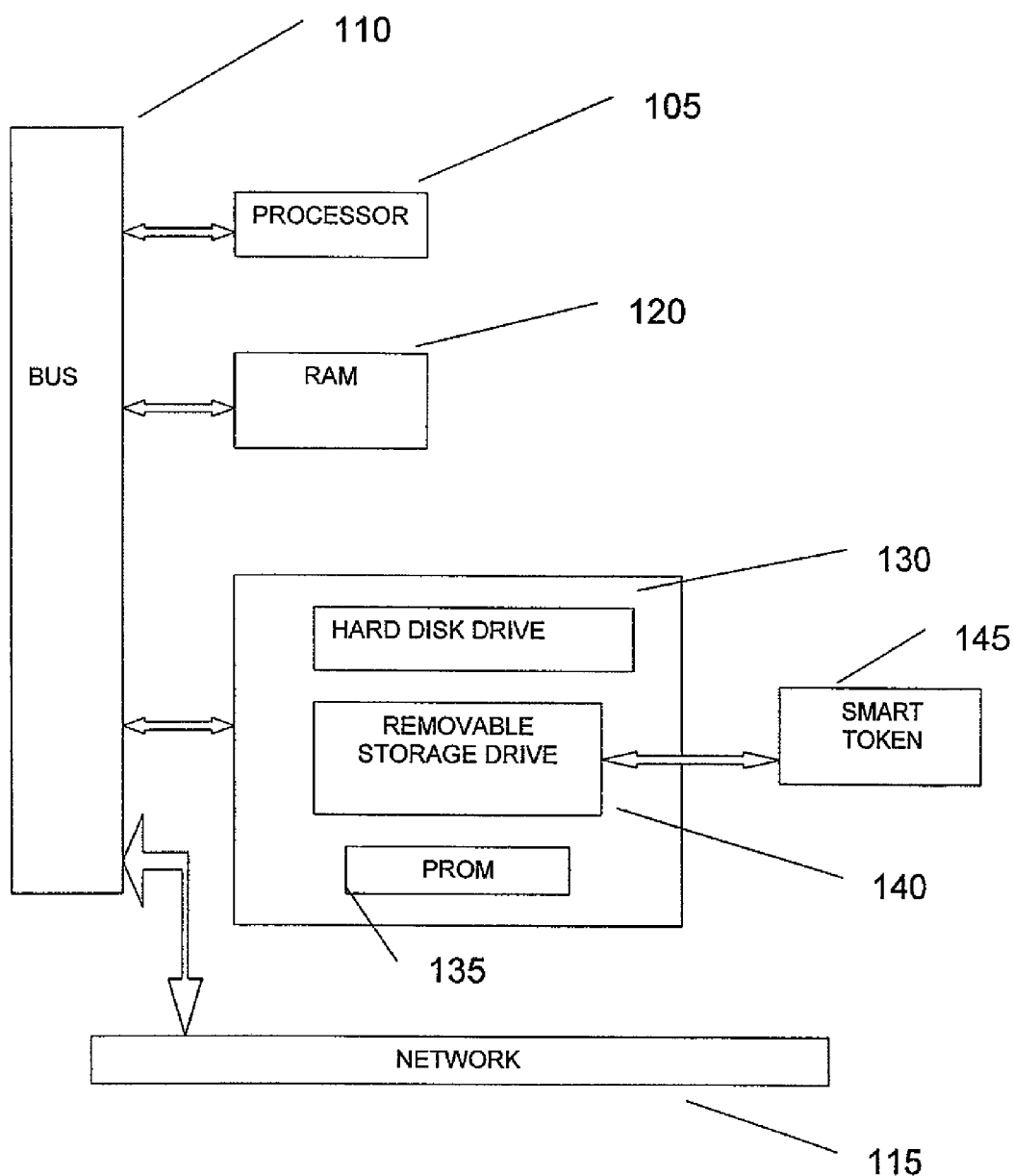
FIG. 6 is a block diagram of a computer system.

Security Administrators can modify access to resources, including adding or removing users. A suitable tool for adding and removing users is the acledit program. The first argument to the acledit program indicates the type of modification being made; subsequent arguments provide additional information as appropriate for the action. This program supports the following types of ACL file updates:

1) Add a new resource
  acledit 1 resource
  where resource is in the format described above.
2) Add an individual's or a group's access to an existing resource
  acledit 2 resource alias rights
  where alias is the individual or group ID and rights are specified as described above
3) Add a new group
  acledit 3 group-name
4) Add an individual to an existing group
  acledit 4 group-name user-name
5) Delete a resource
  acledit 5 resource
6) Delete a group acledit 6 group-name
7) Delete an individual's or group's access to a resource
acledit 7 resource alias
8) Delete an individual from a group
acledit 8 group-name user-name
9) Replace an individual's or group's existing access to a resource
acledit 9 resource alias rights There are several advantages to the secure system of the present invention. The system can employ any type of digital signature or encryption algorithm. It can also employ any commercially available firewall or other bastion host that provides a transaction protocol proxy, filter or control. The protocol gateway, bastion host, and cryptographic gateway are logical units; each component may reside on its own machine or physical platform, for example, workstation class machine depicted in FIG. 6. Alternatively, neighboring components can be combined on a physical platform. For example, the cryptographic gateway and the firewall could reside on the same machine, e.g., a standard PC as illustrated in FIG. 6. The system is also protocol independent and algorithm/mechanism independent. Any network service can be protected by the system described.

Additional advantages are provided by intervening in the client/server connection in the manner described herein. The invention facilitates seamless provision of the security services necessary for high-value electronic commerce without modification to existing applications. In keeping with the invention, the application server resides on a trusted domain and is never directly accessed by clients. The application user interface can be retrieved dynamically from the application server, cryptographic gateway, and or protocol gateway depending upon specific security requirements. Any necessary security services are provided to the user interface before it is exposed to the client. By dynamically retrieving the user interface from the protected application server when requested by the client, the user interface may be protected from modification.

It is to be understood that the embodiments described herein are merely exemplary of the principles of the invention and that, given the foregoing disclosure, a person of skill in the art may make many variations and modifications without departing from the spirit and scope of the invention. All such variations and modifications are intended to be included within the scope of the invention as defined in the appended claims.

The invention claimed is:

1. A method for secure communication between first and second domains comprising:
in a first logical unit:
periodically calculating timestamps and hashes;
transmitting a web form to a node of a first domain responsive to a request where the web form is displayed to a user;
receiving data input to the web form by the user;
enhancing the data by adding one or more security services;
translating the received data from a first network application level protocol to a target network application level protocol while preserving said data security enhancements;
transmitting the translated data across a public network, the first logical unit including a firewall and a protocol gateway that comprise a VPN server;
in a second logical unit:
de-enhancing the translated data;
filtering the translated data to block unauthorized transmissions;
authorizing the filtered data and transmitting the filtered data to a node of the second domain for use in an application;
whereby the one or more security services are added without apparent modification of the application.

2. A method for secure communication between first and second domains comprising:
In a first logical unit:
periodically calculating timestamps and hashes;
transmitting a web form to a node of a first domain responsive to a request where the web form is displayed to a user;
receiving data input to the web form by the user;
enhancing the data by adding one or more security services;
translating the received data from a first network application level protocol to a target network application level protocol while preserving said data security enhancements;
transmitting the translated data across a public network, the first logical unit residing on a first physical platform;
in a second logical unit:
de-enhancing the translated data;
filtering the translated data to block unauthorized transmissions;
authorizing the filtered data and transmitting the filtered data to a node of the second domain for use in an application, the second logical unit residing on a second logical platform;
whereby the one or more security services are added without apparent modification of the application.

3. A method for secure communication between first and second domains comprising:
In a first logical unit:
periodically calculating timestamps and hashes;
transmitting a web form to a node of a first domain responsive to a request where the web form is displayed to a user;
receiving data input to the web form by the user;
enhancing the data by adding one or more security services;
translating the received data from a first network application level protocol to a target network application level protocol while preserving said data security enhancements;
transmitting the translated data across a public network;
in a second logical unit:
de-enhancing the translated data;
filtering the translated data to block unauthorized transmissions;
authorizing the filtered data and transmitting the filtered data to a node of the second domain for use in an application, said first and second logical units residing on a physical platform;
whereby the one or more security services are added without apparent modification of the application.

* * * * *